(12) United States Patent
Sun et al.

(10) Patent No.: US 11,728,722 B2
(45) Date of Patent: Aug. 15, 2023

(54) POWER CONVERTER AND CONTROL CIRCUIT THEREOF

(71) Applicant: SHANGHAI BRIGHT POWER SEMICONDUCTOR CO., LTD., Shanghai (CN)

(72) Inventors: Shungen Sun, Shanghai (CN); Hanfei Yang, Shanghai (CN)

(73) Assignee: SHANGHAI BRIGHT POWER SEMICONDUCTOR CO., LTD., Shanghai (CN)

( * ) Notice: Subject to any disclaimer, the term of this patent is extended or adjusted under 35 U.S.C. 154(b) by 29 days.

(21) Appl. No.: 17/566,307

(22) Filed: Dec. 30, 2021

(65) Prior Publication Data
US 2022/0209646 A1    Jun. 30, 2022

(30) Foreign Application Priority Data

Dec. 31, 2020    (CN) .......................... 202011621639.3

(51) Int. Cl.
| | | |
|---|---|---|
| H02M 1/08 | (2006.01) | |
| G05F 1/575 | (2006.01) | |
| H02M 3/156 | (2006.01) | |
| H02M 1/00 | (2006.01) | |
| H02M 5/22 | (2006.01) | |
| H02M 5/293 | (2006.01) | |

(52) U.S. Cl.
CPC ........... H02M 1/08 (2013.01); H02M 1/0038 (2021.05); H02M 5/225 (2013.01); H02M 5/293 (2013.01); *G05F 1/575* (2013.01); *H02M 1/083* (2013.01); *H02M 3/156* (2013.01)

(58) Field of Classification Search
CPC ........ H02M 3/156; H02M 1/08; H02M 1/083; G05F 1/575
See application file for complete search history.

(56) References Cited

U.S. PATENT DOCUMENTS

| | | | |
|---|---|---|---|
| 8,513,933 B2 | 8/2013 | Notman et al. | |
| 9,774,255 B2* | 9/2017 | Xi | ........................ H02M 3/1588 |
| 10,404,168 B2* | 9/2019 | Trichy | .................. H02M 3/157 |
| 10,734,899 B2 | 8/2020 | Fan et al. | |

(Continued)

FOREIGN PATENT DOCUMENTS

CN        111435819 A      7/2020

*Primary Examiner* — Gary A Nash
(74) *Attorney, Agent, or Firm* — Muncy, Geissler, Olds & Lowe, P.C.

(57) ABSTRACT

A control circuit for a power converter comprising switching transistors and an output inductor is disclosed. One terminal of the output inductor serves as an output node, and another terminal of the output inductor serves as a switching node. The control circuit is configured to generate a control signal for controlling switching transistors in the power converter. The control circuit includes: a RC oscillator network connected to two terminals of the output inductor, the RC oscillator network configured to generate an oscillation signal containing a feedback ramp slope compensation component in response to a change in a voltage across the terminals of the output inductor; a comparator; an on-time generation circuit; and a control signal generation circuit to generate the control signal for controlling the switching transistors in the power converter.

24 Claims, 9 Drawing Sheets

(56) References Cited

U.S. PATENT DOCUMENTS

| | | | |
|---|---|---|---|
| 2015/0002113 A1* | 1/2015 | Miyazaki | H02M 3/156 |
| | | | 323/284 |
| 2017/0085178 A1* | 3/2017 | Larosa | H02M 3/156 |
| 2017/0117805 A1* | 4/2017 | Hane | H02M 3/158 |
| 2017/0346402 A1* | 11/2017 | Ishino | H02M 3/1588 |
| 2018/0123440 A1* | 5/2018 | Lee | H02M 1/08 |
| 2018/0123450 A1* | 5/2018 | Moon | H02M 3/04 |
| 2018/0340964 A1* | 11/2018 | Ranucci | G01R 19/0092 |
| 2019/0238054 A1* | 8/2019 | Flaibani | H02M 3/158 |
| 2019/0245454 A1* | 8/2019 | Kovatchev | H02M 3/156 |

* cited by examiner

POWER CONVERTER AND CONTROL CIRCUIT THEREOF

CROSS-REFERENCE TO RELATED APPLICATION

This application claims the priority of Chinese patent application number 202011621639.3, filed on Dec. 31, 2020, the entire contents of which are incorporated herein by reference.

TECHNICAL FIELD

This application relates generally to the field of power electronics, and particularly to a power converter and a control circuit thereof.

BACKGROUND

Control of a power converter may be accomplished by various means such as voltage control, current control, hysteretic control and constant on-time (COT) control. Among these, COT control has found extensive use thanks to its excellent dynamic response and relatively high efficiency under light loading. In order to enable stable operation in both a continuous inductor current mode (CCM) and a discontinuous inductor current mode (DCM), stricter requirements are being placed on the design and implementation of power converters.

SUMMARY OF THE INVENTION

The problem to be solved hereby is to provide a power converter capable of stable operation in CCM and DCM, as well as a control circuit and method thereof.

The above problem is solved by a control circuit for a power converter provided in this application. The power converter comprises a switching transistor and an output inductor. A first terminal of the output inductor serves as an output node, and a second terminal of the output inductor serves as a switching node. The control circuit is configured to generate a control signal for controlling switching transistors in the power converter. The control circuit comprises:

a RC oscillator network connected to two terminals of the output inductor, the RC oscillator network configured to generate an oscillation signal containing a feedback ramp slope compensation component in response to a change in a voltage across the two terminals of the output inductor, wherein in case of an inductor current being in a zero-current interval and the power converter being operating in a discontinuous inductor current mode (DCM), the RC oscillator network is disconnected from the output inductor, so as to free the oscillation signal from the influence of the voltage across the two terminals of the output inductor;

a comparator comprising a first input, a second input and an output, wherein: the first input of the comparator is configured to receive a reference signal; the second input of the comparator is configured to receive a feedback signal; and the output of the comparator is configured to output a comparison signal, and wherein the oscillation signal is coupled into the reference signal or in the feedback signal;

an on-time generation circuit configured to start a timer based on the comparison signal or the control signal, to generate an on-time timer signal; and a control signal generation circuit configured to generate, based on the comparison signal and the on-time timer signal, the control signal for controlling the switching transistor in the power converter.

In one embodiment of this application, the oscillation signal may be identical with the feedback signal.

In one embodiment of this application, the RC oscillator network may comprise a first switch, a first resistor and a first capacitor, wherein the first switch, the first resistor and the first capacitor are sequentially connected in series and further connected to the two terminals of the output inductor, wherein the oscillation signal is output from a common terminal of the first switch and the first capacitor.

In one embodiment of this application, the RC oscillator network may comprise a first switch, a first resistor and a first capacitor, wherein the first switch, the first resistor and the first capacitor are sequentially connected in series and further connected to the two terminals of the output inductor, wherein the oscillation signal is output from a common terminal of the first resistor and the first capacitor.

In one embodiment of this application, the oscillation signal is superimposed with a signal characterizing an output voltage to generate the feedback signal.

In one embodiment of this application, the RC oscillator network may comprise a second switch, a single-stage or multi-stage RC circuit and a differential amplifier, the second switch and the single-stage or multi-stage RC circuit connected in series and further connected to two terminals of the output inductor, the differential amplifier comprising a first input, a second input and an output, the first and second inputs of the differential amplifier connected to two terminals of a capacitor or resistor in the single-stage or multi-stage RC circuit, wherein the oscillation signal is output from the output of the differential amplifier.

In one embodiment of this application, the RC oscillator network may comprise a single-stage RC circuit, wherein the second switch, and a resistor and a capacitor in the single-stage RC circuit are connected in series and further connected to two terminals of the output inductor, and wherein the first and second inputs of the differential amplifier are respectively connected to two terminals of the resistor or the capacitor in the single-stage RC circuit.

In one embodiment of this application, the RC oscillator network may comprise a multi-stage RC circuit, wherein the second switch, and a resistor and a capacitor in the first stage of the single-stage RC circuit are connected in series and further connected to two terminals of the output inductor, and wherein the first and second inputs of the differential amplifier are respectively connected to two terminals of a resistor or capacitor in the last stage of the single-stage RC circuit.

In one embodiment of this application, the control circuit may further comprise a zero-crossing detection circuit comprising:

a first comparator comprising a first terminal, a second terminal and an output, wherein: the first terminal of the first comparator receives a sense signal characterizing the inductor current of the power converter; the second terminal of the first comparator receives a zero-crossing detection threshold; and the output of the first comparator outputs a zero-crossing indicator signal; and an RS flip-flop module, which outputs a zero-crossing detection result signal and updates zero-crossing detection result signal based on the zero-crossing indicator signal at the terminal of each operating period and before the next operating period begins.

In one embodiment of this application, the zero-crossing detection circuit may further comprise a timer, wherein the zero-crossing detection result signal causes a duration of an off-state of the first switch to be greater than or equal to a duration of oscillation at the switching node within one operating period in the DCM.

The above problem is also solved by a power converter provided in this application, which comprises: a switching transistor; an output inductor comprising a first terminal serving as an output node and a second terminal serving as a switching node; and a control circuit comprising: a RC oscillator network connected to two terminals of the output inductor, the RC oscillator network configured to generate an oscillation signal containing a feedback ramp compensation component in response to a change in a voltage across the two terminals of the output inductor, wherein in case of an inductor current being in a zero-current interval and the power converter being operating in a discontinuous inductor current mode (DCM), the RC oscillator network is disconnected from the output inductor, so as to free the oscillation signal from the influence of the voltage across the two terminals of the output inductor; a comparator comprising a first input, a second input and an output, the first input of the comparator is configured to receive a reference signal, the second input of the comparator is configured to receive a feedback signal, the output of the comparator is configured to output a comparison signal, wherein the oscillation signal is coupled into the reference signal or in the feedback signal; an on-time generation circuit configured to start a timer based on the comparison signal or the control signal, to generate an on-time timer signal; and a control signal generation circuit configured to generate, based on the comparison signal and the on-time timer signal, the control signal for controlling the switching transistors in the power converter.

The advantage of this application over the prior art is that the design of the control circuit in the power converter enables stable operation of the power converter in CCM and DCM.

BRIEF DESCRIPTION OF THE DRAWINGS

The accompanying drawings, which are incorporated in and constitute a part hereof, illustrate embodiments to facilitate the understanding of this application and, together with the specification, serve to explain the disclosed principles. In these figures.

DETAILED DESCRIPTION

Objects, features and advantages of the present application will become more apparent from the following detailed description of specific embodiments hereof, which is to be read in connection with the accompanying drawings.

In the following description, numerous details are set forth so that a full understanding of this application may be acquired. However, the application may be practiced in other forms than those described herein. Therefore, the application is in no way limited to the particular embodiments described hereinafter.

As used herein, the singular forms "a", "an" and/or "the" are intended to include the plural forms as well, unless the context clearly indicates otherwise. In general, the terms "comprising" and "including" only imply the presence of expressly stated steps and elements, which do not constitute an exclusive list though, as other steps or elements may also be included.

In addition, it is to be noted that although the terms first, second, etc. may be used to describe various elements, these terms are only used to distinguish one element from another and have no special meaning unless otherwise stated. Therefore, they should not be construed as limiting the scope of this application in any sense. Additionally, although the terms used herein are selected from common general terms, some terms mentioned in the description of embodiments hereof may be selected by the applicant at his or her discretion, and the detailed meanings thereof are explained in the relevant part of the description herein. Further, the present application should be understood not only by the terms actually used, but also by the meaning contained in each term.

It will be understood that when an element is referred to as being "on", "connected to", "coupled to" or "in contact with" another element, it can be directly on, connected or coupled to, or in contact with the other element or intervening elements may also be present. In contrast, when an element is referred to as being "directly on", "directly connected to", "directly coupled to" or "in direct contact with" another element, there are no intervening elements present. Similarly, when a first element is referred to as being "electrically connected to" or "electrically coupled to" a second element, it is meant that there is an electrical path allowing the passage of a current therethrough between the first and second elements. Such an electrical path may include a capacitor, coupled inductor and/or other element that allows a current to pass therethrough even when there is no direct contact between conductive elements.

In embodiments of this application, there is provided a power converter as well as a control circuit thereof.

Figure 1:
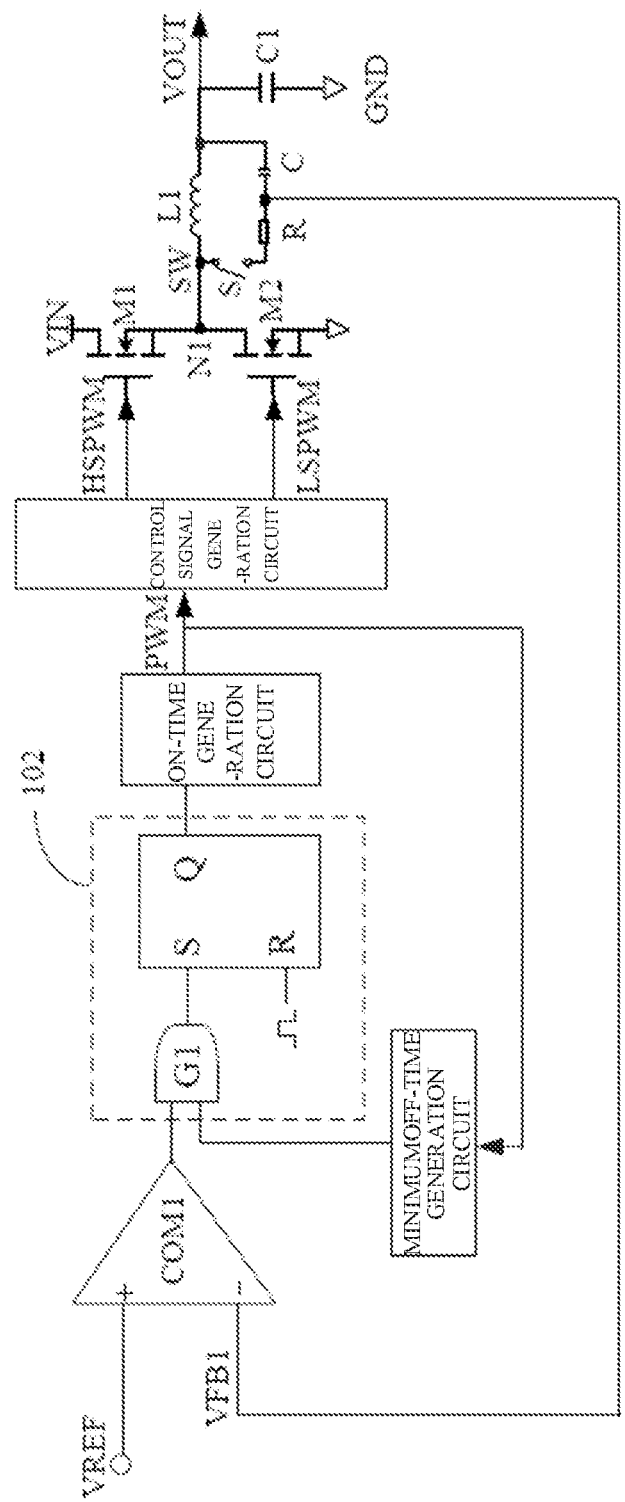
FIG. 1 is a schematic circuit diagram of a power converter according to an embodiment of this application.

FIG. 1 is a schematic circuit diagram of a power converter according to an embodiment of this application. As shown in FIG. 1, the power converter includes a switching circuit and a control circuit. The switching circuit includes switching transistors including, for example, a first switching transistor M1 and a second switching transistor M2, which are connected in series at a common node N1. In one embodiment, each of the first switching transistor M1 and the second switching transistor M2 has a source, a gate and a drain. The first switching transistor M1 and the second switching transistor M2 are connected to an output inductor L1 and an output capacitor C1 via the common node N1. One terminal of the output inductor L1 serves as an output node and is connected to a first terminal of the output capacitor C1, and the other terminal serves as a switching node SW of the output inductor L1. The output capacitor C1 is grounded at a second terminal thereof.

The switching circuit is configured to receive an input voltage VIN and convert it into an output voltage VOUT. In FIG. 1, the input voltage VIN is received at the drain of the first switching transistor M1 in the switching circuit. The source of the second switching transistor is grounded. The output voltage VOUT is present at the first terminal of the output capacitor C1.

In some embodiments, the control circuit of the power converter includes a comparator, a resistor-capacitor (RC) oscillator network, an on-time generation circuit and a control signal generation circuit. The control circuit of the power converter may further include a minimum off-time generation circuit and a logic circuit.

The minimum off-time generation circuit is configured to overcome the influence of the parasitic capacitance of components in the control circuit itself, e.g., the switching transistors, avoiding the power converter from being switched on again before the output voltage of its circuit that is being switched off drops to zero and thus from causing additional circuit loss and conduction and radiation interference or damage to circuit elements.

The logic circuit 102 includes a first input, a second input and an output. The first input of the logic circuit receives a comparison signal output from the comparator COM1. The second input of the logic circuit is coupled to the minimum off-time generation circuit and receives a minimum off-time signal output therefrom. The output of the logic circuit is coupled to an input of the on-time generation circuit.

The on-time generation circuit outputs an on-time signal PWM. The control signal generation circuit receives the on-time signal PWM to generate a first control signal HSPWM for switching on/off the first switching transistor M1 and a second control signal LSPWM for switching on/off the second switching transistor M2.

In one embodiment, as shown in FIG. 1, the logic circuit 102 may include an AND gate G1 and an RS flip-flop. First and second inputs of the AND gate G1 receive the comparison signal and the minimum off-time signal, respectively. An output of the AND gate G1 is connected to an S terminal of the RS flip-flop, and an R terminal of the RS flip-flop receives a reset signal. The reset signal may be either a synchronous signal or an asynchronous signal. A Q output terminal of the RS flip-flop is coupled to the on-time generation circuit to provide an excitation signal.

The RC oscillator network is connected to two terminals of the output inductor and is configured to generate an oscillation signal containing a feedback ramp compensation component in response to a change in a voltage across the terminals of the output inductor. During a zero-current interval of a current through the inductor, when the power converter is operating in a discontinuous inductor current mode (DCM), the RC oscillator network is disconnected from the output inductor, freeing the oscillation signal from the influence of the voltage across two terminals of the output inductor.

As shown in FIG. 1, the comparator COM1 has a first input, a second input and an output. The first input of the comparator is configured to receive a reference signal, and the second input of the comparator is configured to receive a feedback signal. The output of the comparator is configured to output the comparison signal. A value of the reference signal VREF may be set according to the actual conditions.

In FIG. 1, the RC oscillator network includes a first switch S, a first resistor R and a first capacitor C, which are sequentially connected in series and further connected to two terminals of the output inductor, and the oscillation signal is output from a common terminal of the first resistor R and the first capacitor C.

In an alternative embodiment, the components of the RC oscillator network may be connected in other way in which the first resistor R, the first switch S and the first capacitor C are sequentially connected in series and further connected to two terminals of the output inductor, and the oscillation signal is output from a common terminal of the first switch S and the first capacitor C. The oscillation signal is coupled as the feedback signal to the second input of the comparator COM1. That is, at this point, the oscillation signal is just the feedback signal.

In operation of the power converter in a continuous inductor current mode (CCM), when a voltage at the first input of the comparator COM1 is higher than a voltage at the second input, the output of the comparator, i.e., the comparison signal, is pulled high. If the output of the minimum off-time generation circuit is also high, the output of the AND gate G1 is set high. In response to the excitation signal being received at the S terminal of the RS flip-flop, an output signal is generated at the Q terminal, which is coupled to the input of the on-time generation circuit, enabling the on-time generation circuit. As described above, the on-time signal PWM is then generated at the output of the on-time generation circuit and passed through the control signal generation circuit to generate the first control signal HSPWM for switching on/off the first switching transistor M1 and the second control signal LSPWM for switching on/off the second switching transistor M2 and thus enabling power conversion.

In one embodiment, the on-time signal is inversely proportional to the input voltage VIN and proportional to the output voltage VOUT in amplitude. This allows the switching circuit to maintain a substantially constant switching frequency under various conditions of the input voltage VIN and output voltage VOUT.

The feedback voltage VFB1 is coupled to the second input of the comparator. In the circuit shown in FIG. 1, VFB1 is fetched from the connection point between the first resistor R and the first capacitor C in the RC oscillator network. The feedback signal VFB1 contains VOUT component and a ramp compensation signal VRAMP component. A typical waveform diagram of the circuit operating in CCM is shown, for example in FIG. 4A.

In spite of providing fast dynamic response and satisfactory efficiency under light loading, constant on-time (COT) control of the power converter may impose strict requirements on the output voltage's ripple shape.

When not including the RC oscillator network and operating in the CCM mode, the output capacitor may in some cases have a very small equivalent series resistance (ESR). As ripple on the output capacitor C1 lags behind a current $I_L$ in the output inductor L1 in phase by 90 degrees, the output voltage does not reflect variation in $I_L$ in a timely manner. When the first control signal HSPWM is high (assuming the on-time signal PWM is also high), the inductor current $I_L$ increases, but due to the 90-degree phase offset, the output voltage VOUT cannot be established in time, failing to cause the feedback voltage VFB1 that depends only on the output voltage VOUT to ramp. Consequently, it may occur that VFB remains lower than VREF after a current switch-on period of the HSPWM signal has elapsed, creating an unwanted additional PWM pulse, which may lead to unequal intervals of the signal PWM and unstable operation.

By contrast, according to the above embodiments of the this application, as the feedback signal VFB1 is fetched from the connection point between the first resistor R and the first capacitor C in the RC oscillator network, the feedback signal VFB1 contains not only the output voltage VOUT but also the ramp compensation signal VRAMP, resulting in more stable operation of the circuit.

Figure 4A:
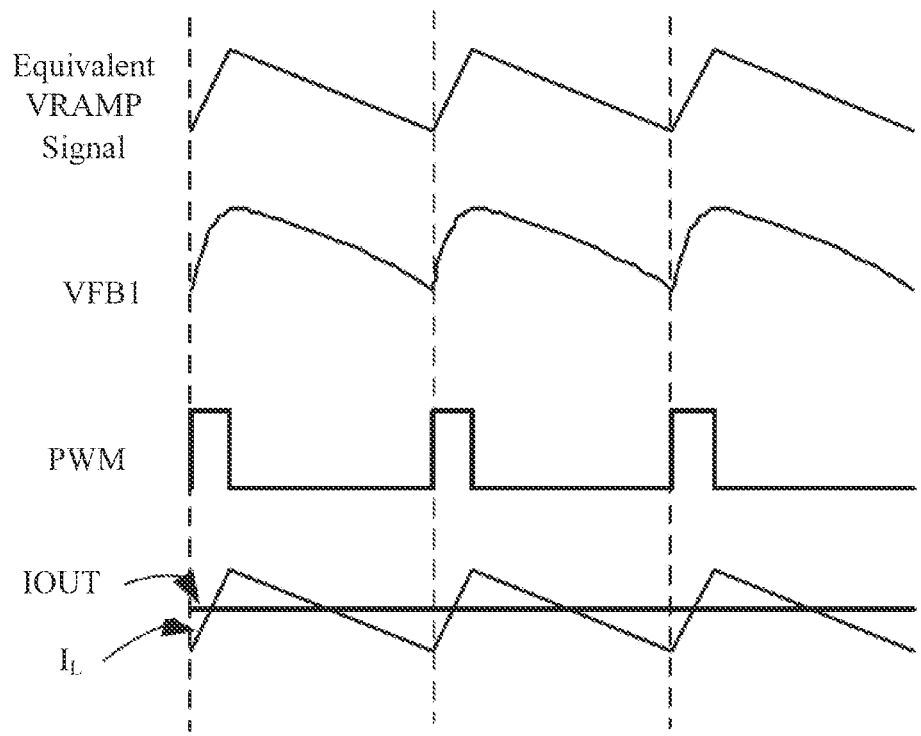
FIG. 4A is a schematic waveform diagram of the power converter in steady-state CCM operation according to an embodiment of this application.

FIG. 4A is a schematic waveform diagram of the power converter in steady-state CCM operation according to an embodiment of this application. An equivalent waveform of the ramp compensation signal VRAMP is, for example, a periodic serrated wave. In FIG. 4A, equivalent waveforms of the VRAMP signal and the feedback signal VFB1 and the on-time signal PWM are shown. Waveforms of the inductor current $I_L$ and the output current $I_{OUT}$ can be seen in FIG. 4A as well. $I_{OUT}$ is a load current, and its waveform is dependent on the characteristics of the load.

In some other embodiments, the power converter of this application includes the switching circuit and the control circuit. The switching circuit is structured and the output inductor and capacitor are connected in the same way as in the embodiment of FIG. 1, and a duplicate description thereof is thus omitted. The control circuit of the power converter includes a first comparator COM1, the RC oscillator network, the on-time generation circuit, the control signal generation circuit, the minimum off-time generation circuit and the logic circuit. A ramp compensation circuit includes the RC oscillator network and a differential amplifier AMP1.

Figure 2:
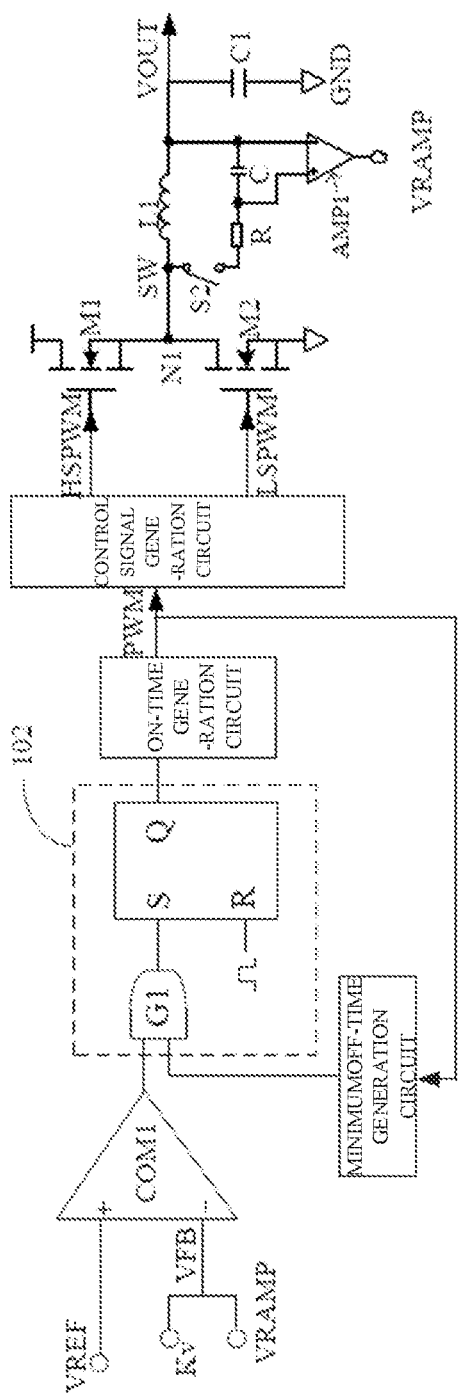
FIG. 2 is a schematic circuit diagram of the power converter according to another embodiment of this application.
Figure 3:
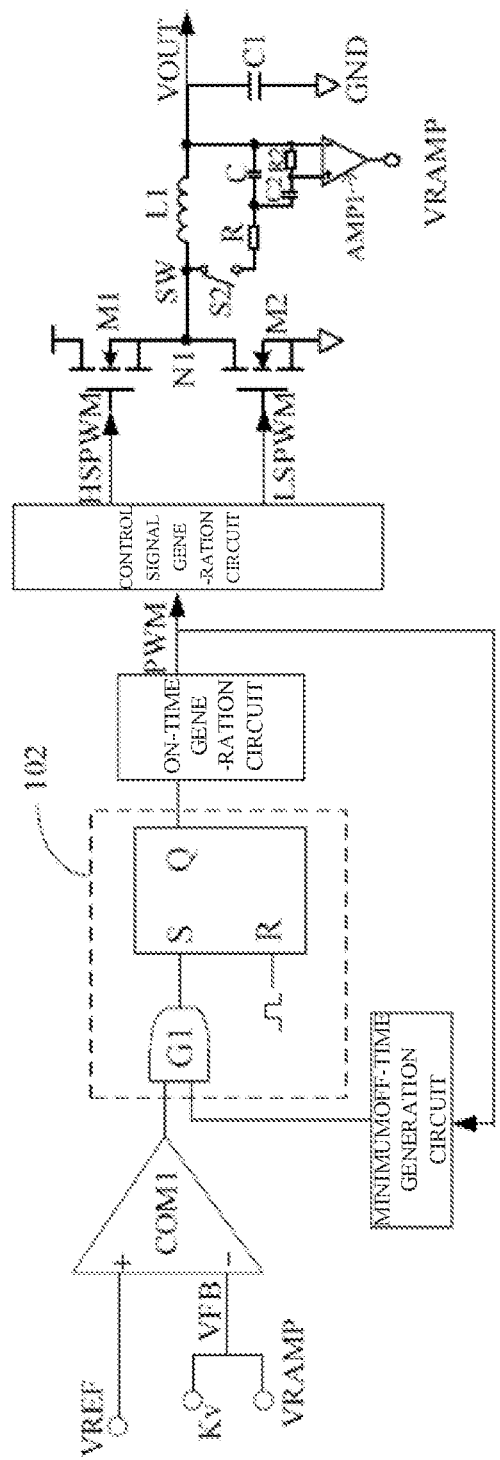
FIG. 3 is a schematic circuit diagram of the power converter according to a further embodiment of this application.

Referring to FIGS. 2 and 3, the RC oscillator network may include a second switch, a single-stage or multi-stage RC circuit and the differential amplifier. The second switch S2 and the single-stage or multi-stage RC circuit may be connected in series and further connected to two terminals of the output inductor L. The differential amplifier may include a first input, a second input and an output. The first and second inputs of the differential amplifier may be connected to two terminals of a capacitor or resistor in the single-stage or multi-stage RC circuit, and the oscillation signal may be output from the output of the differential amplifier. In this case, the feedback signal is the oscillation signal superimposed with a signal Kv characterizing the output voltage. Kv and VOUT satisfy Kv=k*VOUT, 0<k<1. In particular implementations, for example, Kv may be obtained by scaling VOUT using a voltage-dividing resistor.

As shown in FIG. 2, when the RC oscillator network includes a single-stage RC circuit, the second switch S2 may be connected in series with a resistor and a capacitor in the single-stage RC circuit, and they are further connected to two terminals of the output inductor, and the first and second inputs of the differential amplifier may be connected to two terminals of the resistor or capacitor in the single-stage RC circuit.

As shown in FIG. 3, when the RC oscillator network includes a multi-stage RC circuit, the second switch S2 may be connected in series with a resistor and a capacitor in the first stage of the multi-stage RC circuit, and they are further connected to two terminals of the output inductor, and the first and second inputs of the differential amplifier may be connected to two terminals of a resistor or capacitor in the last stage of the multi-stage RC circuit.

In some such embodiments of the power converter circuit, the minimum off-time generation circuit, the on-time generation circuit and the logic circuit may be structured in the same way as in the above embodiments, and a duplicate description thereof is therefore omitted.

Compared with a single-stage RC circuit, in addition to the conditions of the current input, a multi-stage RC circuit (further including a second-order RC circuit, or additionally one or more higher order RC circuits) further takes in amount the circuit's output values at two previous times. The introduction of such previous output values helps in better reflecting variation of the output voltage VOUT and allows adjustments in the control signal to better track the VOUT variation, thus achieving even faster dynamic response.

In some such embodiments of this application shown in, e.g., FIG. 2 or 3, in CCM operation of the power converter circuit, when a voltage at the first input of the comparator COM1 is higher than a voltage at the second input, the output of the comparator, i.e., the comparison signal, is pulled high. If the output of the minimum off-time generation circuit is also high, the output of the AND gate G1 is set high. In response to the excitation signal being received at the S terminal of the RS flip-flop, an output signal is generated at the Q terminal, which is coupled to the input of the on-time generation circuit, enabling the on-time generation circuit. As described above, the on-time signal PWM is then generated at the output of the on-time generation circuit and then passed through the control signal generation circuit to generate the first control signal HSPWM for switching on/off the first switching transistor M1 and the second control signal LSPWM for switching on/off the second switching transistor M2 and thus enabling power conversion.

In one embodiment, the on-time signal is inversely proportional to the input voltage VIN and proportional to the output voltage VOUT in amplitude. This allows the switching circuit to maintain a substantially constant switching frequency under various conditions of the input voltage VIN and output voltage VOUT.

According to the preceding embodiments of this application, not only the VFB signal that is dependent on the VOUT signal but also the ramp compensation signal VRAMP is received by the second input of the first comparator COM1. This overcomes the problem that, in some cases with a very small equivalent series resistance (ESR) of the output capacitor, as ripple on the output capacitor C1 lags behind a current $I_L$ in the output inductor L1 in phase by 90 degrees, the output voltage does not reflect variation in $I_L$ in a timely manner and may create an unwanted additional PWM pulse during the circuit's operation, which may lead to unequal intervals of the signal PWM and unstable operation. Thus, stable CCM operation of the power converter circuit is ensured.

Figure 4B:
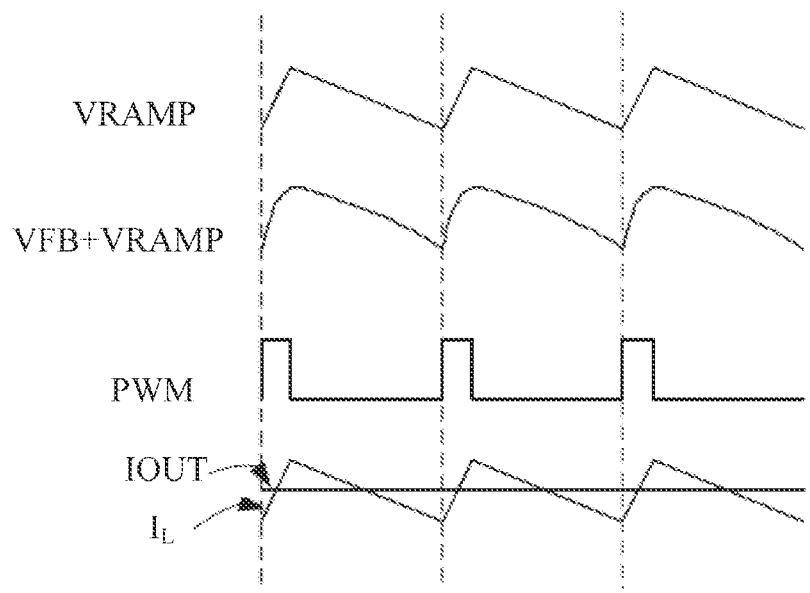
FIG. 4B is a schematic waveform diagram of the power converter in steady-state CCM operation according to an embodiment of this application.

FIG. 4B is a schematic waveform diagram of the power converter in steady-state CCM operation according to an embodiment of this application. A waveform of the ramp compensation signal VRAMP is, for example, a periodic serrated wave. FIG. 4B shows a waveforms of the VRAMP signal, a waveforms of the feedback signal VFB superimposed with the ramp slope compensation signal VRAMP, and a waveform of the on-time signal PWM. In FIG. 4B, waveforms of the inductor current $I_L$ and the output current IOUT can be seen as well. IOUT is a load current, and its waveform is dependent on the characteristics of the load.

In one embodiment of this application, as shown in FIG. 1, in DCM operation of the power converter circuit, when the RC oscillator network is connected in, the second switching transistor M2 with be turned off after the energy in the output inductor L1 is depleted (i.e., the inductor current $I_L$ crosses zero). As a result, the switching node (SW node) will experience an abrupt change, which may cause resonance and generate a ringing wave. In this case, the inductor L1 is equivalent to a zero-resistance resistor, and damped oscillation around VOUT, i.e., averaging at VOUT, occurs at the switching node (SW node).

Specifically, immediately before the current $I_L$ in the output inductor L1 crosses zero, as the voltage VSW at the switching node (SW node) is approximately equal to the ground potential, the current flows from the connection point between the first resistor R and the first capacitor C toward the switching node (SW node), and the voltage VOUT is decreasing. At the same time, the voltage at the connection point between R and C, and hence the VOUT and VRAMP components in the feedback voltage VFB1, is also decreasing. However, since an abrupt change is impossible for the voltage across the terminals of the capacitor, upon zero-crossing of the inductor current $I_L$, the voltage at the connection point between R and C remains the same as the value prior to the zero crossing. At the same time, as noted above, the voltage at the switching node (SW node) abruptly changes to VOUT and begins to oscillate. In order to facilitate the generation of a serrated waveform like a triangular waveform by the feedback network, the voltage at the connection point between R and C (or RC midpoint) is generally configured to be lower than the output voltage VOUT, i.e., VOUT>VFB1, throughout the circuit's each operating period.

Figure 5:
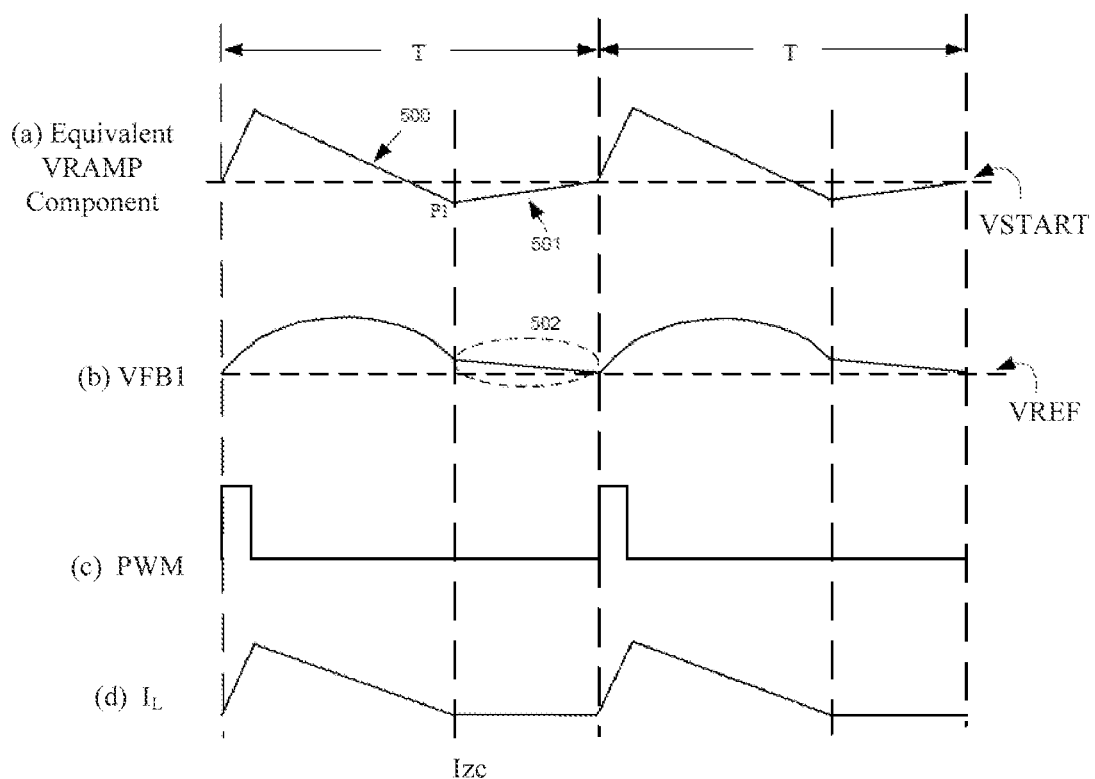
FIG. 5 is a schematic waveform diagram of the power converter in DCM operation with a RC oscillator network being connected therein according to an embodiment of this application.

At this point, the VOUT component in the feedback signal VFB1 further decreases with the decreasing of VOUT. In the case of the RC oscillator network being connected in, because the voltage at the SW node VSW>VFB1, the RC oscillator network can still be charged, increasing the VRAMP component originating from the RC oscillator network, as indicated by a slow ramp 501 in chart (a) of FIG. 5. In chart (a) of FIG. 5, the horizontal dashed line VSTART represents an initial value of the equivalent VRAMP component at the beginning of each period. In steady-state operation of the circuit, the equivalent VRAMP component goes back to the initial value after each period T. As shown, when decreasing 500 to the initial value VSTART, the equivalent VRAMP component continues decreasing and reaches a minimum level P1 in the period upon a zero crossing of the inductor current $I_L$. In FIG. 5, P1 is drawn on a vertical dashed line Izc representing the zero-crossing of the inductor current $I_L$. P1 may be set in accordance with an amount of subsequent rise 501 of the equivalent VRAMP component back to the initial value VSTART. It is to be noted that the initial value VSTART is not zero. Chart (c) of FIG. 5 schematically shows the PWM signal generated by the on-time generation circuit. Chart (d) of FIG. 5 is a schematic waveform diagram of the inductor current $I_L$.

As a superimposition of the decreasing VOUT component and the increasing VRAMP signal, the feedback voltage VFB1 decreases at a reduced rate in DCM operation, as shown, e.g., in chart (b) of FIG. 5, where the horizontal dashed line represents the reference voltage VREF. The more slowly decreasing VFB1 must be kept at a relatively small offset from VREF over a relatively long time interval, as indicated by the dashed circle 502 in FIG. 5, in order to ensure that it reaches the reference voltage VREF at a desired time point. However, swinging of the voltage VSW at the switching node (SW node) or other interference can easily deflect VFB1 and cause it to reach VREF earlier than expected within the time interval indicated by the dashed circle 502. This may lead to false triggering of the comparator COM1 and a premature action of the control circuit.

In order to overcome this, in the embodiment of this application shown in FIG. 1, the first switch S in the RC oscillator network may include a control terminal.

In some embodiments, the control circuit of the power converter further includes a current zero-crossing detection circuit for detecting whether there is a zero crossing of the power converter's inductor current in the current period and outputting a zero-crossing detection result signal to the RC oscillator network.

When detecting a zero-crossing of the inductor current in the power converter within the current period, the zero-crossing detection circuit outputs a zero-crossing detection result signal indicating that the inductor current is zero.

Figure 7:
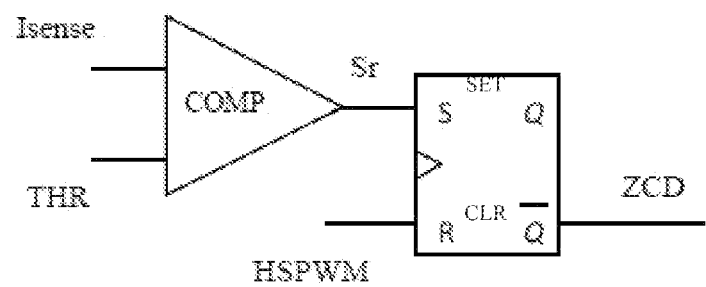
FIG. 7 is a structural schematic of a zero-crossing detection circuit in the power converter according to an embodiment of this application.

In one embodiment, as shown in FIG. 7, the zero-crossing detector includes a first comparator COMP and a RS flip-flop. The first comparator COMP has a first terminal, a second terminal and an output. The first terminal receives a sense signal Isense that characterizes the inductor current in the power converter. The second terminal receives a zero-crossing detection threshold THR, and a zero-crossing indicator signal Sr is output from the output. The zero-crossing detection result signal ZCD is output from a $\overline{Q}$ output of the RS flip-flop. The zero-crossing indicator signal Sr is coupled to an S terminal of the RS flip-flop, and the first control signal HSPWM is connected to an R terminal of the RS flip-flop. The RS flip-flop module updates the zero-crossing detection result signal based on the zero-crossing indicator signal Sr at the end of each operating period and before the next operating period begins. As a particular example, the ZCD signal is set upon the arrival of a valid section of Sr, and is reset upon the arrival of a rising edge of HSPWM. The zero-crossing detection result (ZCD signal) opens the first switch in a zero-current interval in DCM operation of the power converter. In particular, the zero-crossing detection result signal may accomplish this by controlling the control terminal of the first switch S. The first switch S may be, for example, a transistor switch of a certain type.

Figure 8:
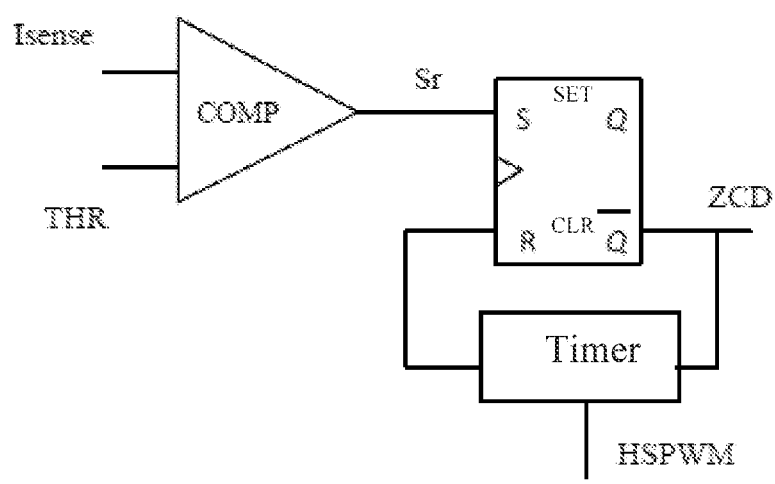
FIG. 8 is a structural schematic of a zero-crossing detection circuit in the power converter according to another embodiment of this application.

When the first switch S in the RC oscillator network is opened in response to the occurrence of a zero-crossing of the current $I_L$ through the output inductor L1, the RC oscillator network is disconnected. Before the first switch S is re-closed, the equivalent VRAMP component maintains the value at the time when the zero-crossing of the inductor current $I_L$ occurred. A length of time that the first switch is kept open by the zero-crossing detection result signal is greater than or equal to a duration of oscillation at the switching node within one operating period in DCM operation. Specifically, as shown in, e.g., FIG. 8, the zero-crossing detection circuit may further include a timer configured to cause the duration of an off-state of the first switch to be greater than or equal to the duration of oscillation at the switching node within one operating period in DCM operation. In FIG. 8, the timer may be configured with a predetermined time value that is greater than or equal to the duration of oscillation. After the timer expires, it may output a high level to the R terminal of the RS flip-flop to reset the ZCD signal. Specifically, the timer may output the high level to the R terminal of the RS flip-flop to reset the ZCD signal as soon as the rising edge of the first control signal HSPWM arrives. Another input of the timer may be connected to the ZCD signal to obtain a timing reference. According to this embodiment, since VFB1 can maintain a normal decreasing rate against VOUT rather than decreasing at a slower rate as shown in FIG. 5, a considerable offset can be maintained between the reference signal VREF and VFB1, mitigating the problem of false triggering.

Figure 6:
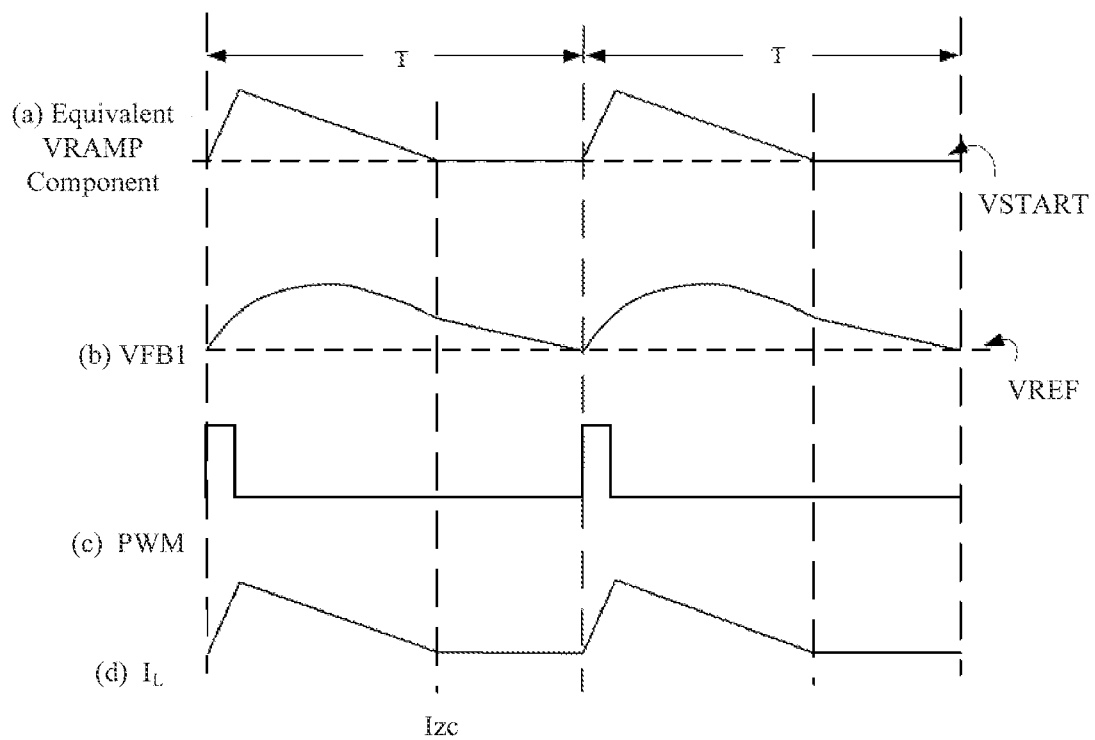
FIG. 6 schematically illustrates waveforms of the power converter in DCM operation with the RC oscillator network being connected therein and disconnected therefrom according to an embodiment of this application.

In FIG. 6, the first switch S may be opened upon the occurrence of a zero-crossing of the inductor current $I_L$ until the next period begins. As a result, the equivalent VRAMP component maintains the specific value at the time interval when the zero-crossing of the inductor current $I_L$ occurred until the next period begins. In the case of FIG. 6, the specific value is the aforementioned initial value VSTART.

In the embodiment of the power converter circuit shown in FIG. 2 or 3, after the second switching transistor M2 is turned off in response to depletion of energy in the output inductor L1 (e.g., a zero-crossing of the inductor current $I_L$), if the RC oscillator network is connected in the power converter circuit, damped oscillation may likewise take place around VOUT at the switching node (SW node). Similarly, this may lead to false triggering as described above in conjunction with FIG. 5, which is detrimental to stable operation of the power converter in the DCM, as particularly shown in FIG. 8.

Accordingly, in the embodiments of this application shown in FIGS. 2 and 3, the second switch S2 in the RC oscillator network may further include a control terminal. In this case, as discussed above, the power converter may further include a zero-crossing detection circuit for outputting a zero-crossing detection result signal, which may be transmitted to the control terminal of the second switch S2 in the RC oscillator network to open the second switch S2 in a zero-current interval of the inductor current. The second switch S2 may be, for example, a transistor switch of a certain type. Reference may be made to the above description for structural details of the zero-crossing detection circuit.

Figure 9:
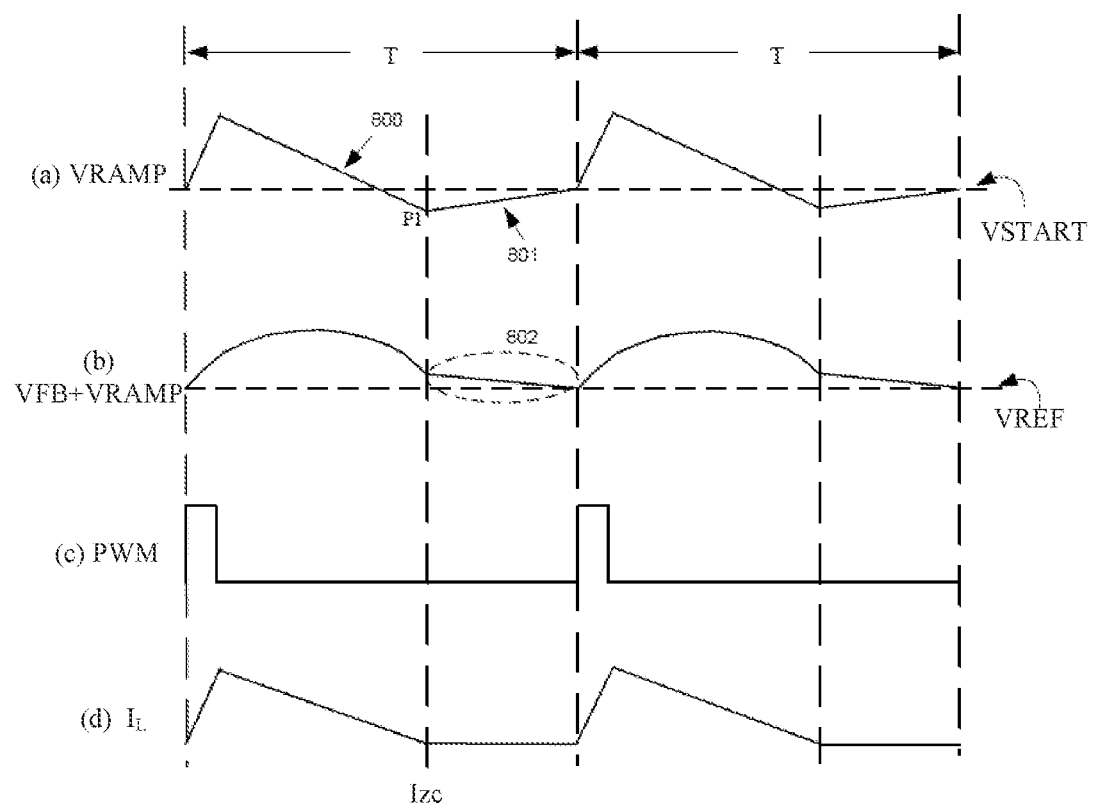
FIG. 9 is a schematic waveform diagram of the power converter in DCM operation with a RC oscillator network being connected in according to an embodiment of this application.

The second switch S2 in the RC oscillator network may be opened upon the occurrence of a zero-crossing of the current $I_L$ through the output inductor L1, thus disconnecting the RC oscillator network. Likewise, the value of VRAMP is maintained at the specific value at the time when the zero-crossing of the inductor current $I_L$ occurred and the second switch S2 was opened. A length of time that the second switch is kept open by the zero-crossing detection result signal is greater than or equal to a duration of oscillation at the switching node within one operating period in DCM operation. In particular, this may be accomplished by, for example, a timer in the zero-crossing detection circuit shown in FIG. 8. According to this embodiment, since VFB+VRAMP can maintain a normal decreasing rate against VOUT rather than decreasing at a slower rate as shown in FIG. 9, a considerable offset can be maintained between the reference signal VREF and VFB, mitigating the problem of false triggering.

Figure 10:
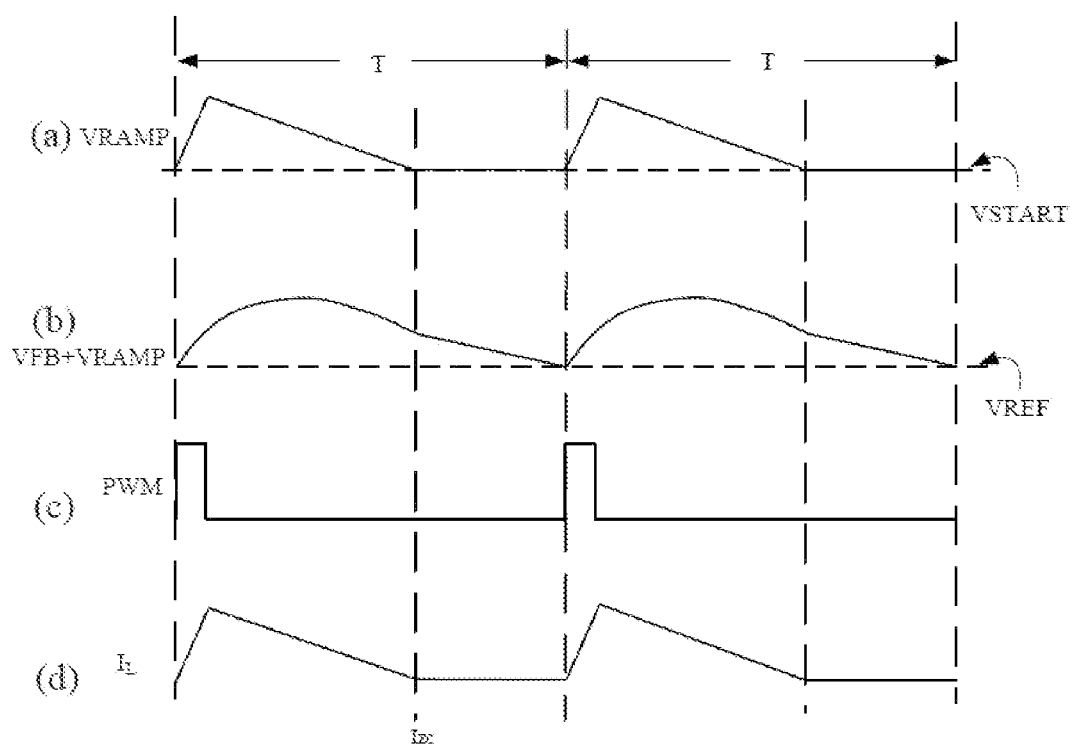
FIG. 10 schematically illustrates waveforms of the power converter in DCM operation with the RC oscillator network being connected therein and disconnected therefrom according to an embodiment of this application.

In FIG. 10, the second switch S2 may be opened upon the occurrence of a zero-crossing of the inductor current $I_L$ until the next period begins. As a result, VRAMP maintains the specific value at the time when the zero-crossing of the inductor current $I_L$ occurred until the next period begins. In the case of FIG. 10, the specific value is also the aforementioned initial value VSTART. According to the power converter and the control circuit thereof, the design of the control circuit enables stable operation of the power converter in CCM and DCM.

Herein, particular phrases have been used to describe embodiment(s) of this application. For example, "one embodiment", "an embodiment" and/or "some embodiments" are intended to refer to a particular feature, structure, or characteristic related to at least one embodiment hereof. Thus, it is to be noted and stressed that appearances of the phrases "one embodiment", "an embodiment" or "an alternative embodiment" mentioned separately in two or more places throughout this specification are not necessarily all referring to the same embodiment. Furthermore, the particular features, structures or characteristics described in connection with one or more embodiments may be combined in any suitable manner.

Similarly, it should be appreciated that, in the foregoing description of embodiments hereof, various features are sometimes grouped together in a single embodiment, figure, or description thereof for the purpose of streamlining the disclosure and aiding in the understanding of one or more of the embodiments hereof. This method of disclosure, however, is not to be interpreted as reflecting an intention that the claimed subject matter hereof requires more features than are expressly recited in each claim. Rather, as the following claims reflect, embodiments lie in less than all features of a single foregoing disclosed embodiment.

While the present application has been described with reference to embodiments illustrated and described herein, those of ordinary skill in the art will recognize that the above embodiments are merely illustrative of this application and various equivalent modifications or substitutions can be made thereto substantially within the spirit hereof. Therefore, any and all changes and variations made to the foregoing embodiments within the essential scope of spirit of the present application fall within the scope of the appended claims.

What is claimed is:

1. A control circuit for a power converter, the power converter comprising a switching transistor and an output inductor, wherein the output inductor comprises a first terminal serving as an output lode and a second terminal serving as a switching node, wherein the control circuit is configured to generate a control signal for controlling the switching transistor in the power converter, and wherein the control circuit comprises:

a resistor-capacitor (RC) oscillator network connected in parallel to the output inductor, wherein the RC oscillator network is configured to generate an oscillation signal containing a feedback ramp compensation component in response to a change in a voltage across the output inductor, wherein in case of an inductor current being in a zero-current interval and the power converter being operating in a discontinuous inductor current mode (DCM), the RC oscillator network is disconnected from the output inductor, so as to free the oscillation signal from an influence of the voltage across the output inductor;

a comparator comprising a first input, a second input and an output, wherein: the first input of the comparator is configured to receive a reference signal; the second input of the comparator is configured to receive a feedback signal; and the output of the comparator is configured to output a comparison signal, and wherein the oscillation signal is coupled into the reference signal or in the feedback signal;

an on-time generation circuit configured to start a timer based on the comparison signal or a control signal, to generate an on-time timer signal; and a control signal generation circuit configured to generate, based on the comparison signal and the on-time timer signal, the control signal for controlling the switching transistor in the power converter.

2. The control circuit of claim 1, wherein the oscillation signal is identical with the feedback signal.

3. The control circuit of claim 2, wherein the RC oscillator network comprises a first switch, a first resistor and a first capacitor, wherein the first switch, the first resistor and the first capacitor are sequentially connected in series, and further connected in parallel to the output inductor, and wherein the oscillation signal is output from a common terminal of the first switch and the first capacitor.

4. The control circuit of claim 3, further comprising a zero-crossing detection circuit, wherein the zero-crossing detection circuit comprises:
  a first comparator comprising a first terminal, a second terminal and an output, wherein: the first terminal of the first comparator receives a sense signal characterizing the inductor current of the power converter; the second terminal of the first comparator receives a zero-crossing detection threshold; and the output of the first comparator outputs a zero-crossing indicator signal; and
  an RS flip-flop module, wherein the RS flip-flop module is configured to output a zero-crossing detection result signal and to update the zero-crossing detection result signal based on the zero-crossing indicator signal at an end of each operating period and before a next operating period begins.

5. The control circuit of claim 4, wherein the zero-crossing detection circuit further comprises a timer, and wherein the zero-crossing detection result signal causes a duration of an off-state of the first switch to be greater than or equal to a duration of an oscillation at the switching node within one operating period in the DCM.

6. The control circuit of claim 2, wherein the RC oscillator network comprises a first switch, a first resistor and a first capacitor, wherein the first switch, the first resistor and the first capacitor are sequentially connected in series, and further connected in parallel to the output inductor, and wherein the oscillation signal is output from a common terminal of the first resistor and the first capacitor.

7. The control circuit of claim 1, wherein the oscillation signal is superimposed with a signal characterizing an output voltage to generate the feedback signal.

8. The control circuit of claim 7, wherein the RC oscillator network comprises a second switch, a single-stage or multi-stage RC circuit and a differential amplifier, wherein the second switch and the single-stage or multi-stage RC circuit are connected in series, and further connected in parallel to the output inductor, wherein the differential amplifier comprises a first input, a second input and an output, wherein the first and second inputs of the differential amplifier are connected to two terminals of a capacitor or a resistor in the single-stage or multi-stage RC circuit, and wherein the oscillation signal is output from the output of the differential amplifier.

9. The control circuit of claim 8, wherein in case of the RC oscillator network comprising a single-stage RC circuit, the second switch, and a resistor and a capacitor in the single-stage RC circuit are connected in series and further connected in parallel to the output inductor, and wherein the first and second inputs of the differential amplifier are respectively connected to two terminals of the resistor or the capacitor in the single-stage RC circuit.

10. The control circuit of claim 8, wherein in case of the RC oscillator network comprising a multi-stage RC circuit, the second switch, and a resistor and a capacitor in a first stage of the multi-stage RC circuit are connected in series and further connected in parallel to the output inductor, and wherein the first and second inputs of the differential amplifier are respectively connected to two terminals of a resistor or a capacitor in a last stage of the multi-stage RC circuit.

11. The control circuit of claim 8, further comprising a zero-crossing detection circuit, wherein the zero-crossing detection circuit comprises:
  a first comparator comprising a first terminal, a second terminal and an output, wherein the first terminal of first comparator receives a sense signal characterizing the inductor current of the power converter; the second terminal of first comparator receives a zero-crossing detection threshold; and the output of first comparator outputs a zero-crossing indicator signal; and
  an RS flip-flop module, wherein the RS flip-flop module is configured to output a zero-crossing detection result signal and to update the zero-crossing detection result signal based on the zero-crossing indicator signal at an end of each operating period and before a next operating period begins.

12. The control circuit of claim 11, wherein the zero-crossing detection circuit further comprises a timer, and wherein the zero-crossing detection result signal causes a duration of an off-state of the second switch to be greater than or equal to a duration of an oscillation at the switching node within one operating period in the DCM.

13. A power converter, comprising:
  a switching transistor;
  an output inductor comprising a first terminal serving as an output node and a second terminal serving as a switching node; and
  a control circuit comprising:
  a resistor-capacitor (RC) oscillator network connected in parallel to the output inductor, wherein the RC oscillator network is configured to generate an oscillation signal containing a feedback ramp compensation component in response to a change in a voltage across the output inductor, wherein in case of an inductor current being in a zero-current interval and the power converter being operating in a discontinuous inductor current mode (DCM), the RC oscillator network is disconnected from the output inductor, so as to free the oscillation signal from an influence of the voltage across the output inductor;
  a comparator comprising a first input, a second input and an output, wherein the first input of the comparator is configured to receive a reference signal; the second input of the comparator is configured to receive a feedback signal; and the output of the comparator is configured to output a comparison signal, wherein the oscillation signal is coupled into the reference signal or in the feedback signal;
  an on-time generation circuit configured to start a timer based on the comparison signal or a control signal, to generate an on-time timer signal; and
  a control signal generation circuit configured to generate, based on the comparison signal and the on-time timer signal, the control signal for controlling the switching transistors in the power converter.

14. The power converter of claim 13, wherein the oscillation signal is identical with the feedback signal.

15. The control circuit of claim 14, wherein the RC oscillator network comprises a first switch, a first resistor and a first capacitor, wherein the first switch, the first resistor and the first capacitor are sequentially connected in series, and further connected in parallel to the output inductor, and wherein the oscillation signal is output from a common terminal of the first switch and the first capacitor.

16. The power converter of claim 15, further comprising a zero-crossing detection circuit, wherein the zero-crossing detection circuit comprises:
a first comparator comprising a first terminal, a second terminal and an output, wherein the first terminal of the first comparator receives a sense signal characterizing the inductor current of the power converter; the second terminal of the first comparator receives a zero-crossing detection threshold; and the output of the first comparator outputs a zero-crossing indicator signal; and
an RS flip-flop module, wherein the RS flip-flop module is configured to output a zero-crossing detection result signal and to update the zero-crossing detection result signal based on the zero-crossing indicator signal at an end of each operating period and before a next operating period begins.

17. The power converter of claim 16, wherein the zero-crossing detection circuit further comprises a timer, and wherein the zero-crossing detection result signal causes a duration of an off-state of the first switch to be greater than or equal to a duration of an oscillation at the switching node within one operating period in the DCM.

18. The power converter of claim 14, wherein the RC oscillator network comprises a first switch, a first resistor and a first capacitor, wherein the first switch, the first resistor and the first capacitor are sequentially connected in series, and further connected in parallel to the output inductor, and wherein the oscillation signal is output from a common terminal of the first resistor and the first capacitor.

19. The power converter of claim 13, wherein the oscillation signal is superimposed with a signal characterizing an output voltage to generate the feedback signal.

20. The power converter of claim 19, wherein the RC oscillator network comprises a second switch, a single-stage or multi-stage RC circuit and a differential amplifier, wherein the second switch and the single-stage or multi-stage RC circuit are connected in series, and further connected in parallel to the output inductor, wherein the differential amplifier comprises a first input, a second input and an output, wherein the first and second inputs of the differential amplifier are connected to two terminals of a capacitor or resistor in the single-stage or multi-stage RC circuit, and wherein the oscillation signal is output from the output of the differential amplifier.

21. The power converter of claim 20, wherein in case of the RC oscillator network comprising a single-stage RC circuit, the second switch, and a resistor and a capacitor in the single-stage RC circuit are connected in series and further connected in parallel to the output inductor, and wherein the first and second inputs of the differential amplifier are connected to two terminals of the resistor or capacitor in the single-stage RC circuit.

22. The power converter of claim 20, wherein in case of the RC oscillator network comprising a multi-stage RC circuit, the second switch, and a resistor and a capacitor in the first stage of the multi-stage RC circuit are connected in series and further connected in parallel to the output inductor, and wherein the first and second inputs of the differential amplifier are connected to two terminals of a resistor or capacitor in a last stage of the multi-stage RC circuit.

23. The power converter of claim 20, further comprising a zero-crossing detection circuit, wherein the zero-crossing detection circuit comprises:
a first comparator comprising a first terminal, a second terminal and an output, wherein the first terminal of the first comparator receives a sense signal characterizing the inductor current of the power converter; the second terminal of the first comparator receives a zero-crossing detection threshold; and the output of the first comparator outputs a zero-crossing indicator signal; and
an RS flip-flop module, wherein the RS flip-flop module is configured to output a zero-crossing detection result signal and to update the zero-crossing detection result signal based on the zero-crossing indicator signal at an end of each operating period and before a next operating period begins.

24. The power converter of claim 23, wherein the zero-crossing detection circuit further comprises a timer, and wherein the zero-crossing detection result signal causes a duration of an off-state of the second switch to be greater than or equal to a duration of an oscillation at the switching node within one operating period in the DCM.

* * * * *